United States Patent
Lindee et al.

(10) Patent No.: US 7,309,228 B2
(45) Date of Patent: Dec. 18, 2007

(54) HYDRAULIC PUMP SYSTEM FOR A PATTY-FORMING APPARATUS

(75) Inventors: Scott A. Lindee, Mokena, IL (US); James E. Pasek, Tinley Park, IL (US); David Hancock, Morris, IL (US)

(73) Assignee: Formax, Inc., Mokena, IL (US)

( * ) Notice: Subject to any disclaimer, the term of this patent is extended or adjusted under 35 U.S.C. 154(b) by 429 days.

(21) Appl. No.: 10/942,738

(22) Filed: Sep. 16, 2004

(65) Prior Publication Data

US 2005/0074338 A1  Apr. 7, 2005

Related U.S. Application Data

(60) Provisional application No. 60/503,354, filed on Sep. 16, 2003, provisional application No. 60/515,585, filed on Oct. 29, 2003.

(51) Int. Cl.
 *A22C 7/00* (2006.01)
(52) U.S. Cl. ............... 425/574; 425/556; 426/512; 426/513
(58) Field of Classification Search ............... 426/512, 426/513; 425/574, 556
 See application file for complete search history.

(56) References Cited

U.S. PATENT DOCUMENTS

| | | | |
|---|---|---|---|
| 3,704,821 A * | 12/1972 | Loyd et al. | 228/2.3 |
| 3,816,029 A * | 6/1974 | Bowen et al. | 417/223 |
| 3,952,478 A | 4/1976 | Richards et al. | |
| 4,054,967 A | 10/1977 | Sandberg et al. | |
| RE30,096 E | 9/1979 | Richards | |
| 4,182,003 A | 1/1980 | Lamartino et al. | |
| 4,356,595 A | 11/1982 | Sandberg et al. | |
| 4,372,008 A | 2/1983 | Sandberg | |
| 4,691,411 A * | 9/1987 | Higashimoto | 452/43 |
| 4,821,376 A | 4/1989 | Sandberg | |
| 4,996,743 A | 3/1991 | Janssen | |
| 5,141,408 A * | 8/1992 | Conrad et al. | 417/339 |
| 5,762,973 A * | 6/1998 | Holzschuh | 425/145 |
| 6,368,092 B1 * | 4/2002 | Lindee et al. | 425/107 |

* cited by examiner

*Primary Examiner*—Robert Davis
*Assistant Examiner*—Maria Veronica Ewald
(74) *Attorney, Agent, or Firm*—The Law Office of Randall T. Erickson, P.C.

(57) ABSTRACT

An improved hydraulic system is provided for a reciprocating mold plate, patty-forming apparatus wherein food product is delivered under pressure from a pump cylinder to mold plate cavities. The plunger is driven during a first phase by force from a hydraulic cylinder from a retracted position distant from the pump cylinder to a ready position initially compressing food product loaded into said pump cylinder. Thereafter, the plunger is driven during a second phase by the hydraulic cylinder to load food product under pressure into the mold plate cavities. The hydraulic cylinder is supplied with hydraulic fluid during the first phase by a low pressure hydraulic fluid pump and during the second phase by a high pressure hydraulic fluid pump. According to the invention, the low pressure hydraulic fluid pump and the high pressure hydraulic fluid pump are positioned within a reservoir, at least partially submerged in hydraulic fluid held within the reservoir, during operation. The low pressure hydraulic fluid pump and the high pressure hydraulic fluid pump are connected in series to the drive shaft of an electric motor located outside the reservoir.

12 Claims, 13 Drawing Sheets

HYDRAULIC PUMP SYSTEM FOR A PATTY-FORMING APPARATUS

This application claims the benefit of U.S. provisional application Ser. No. 60/503,354, filed Sep. 16, 2003 and U.S. provisional application Ser. No. 60/515,585, filed Oct. 29, 2003.

BACKGROUND OF THE INVENTION

Use of pre-processed foods, both in homes and in restaurants, has created a demand for high-capacity automated food processing equipment. That demand is particularly evident with respect to hamburgers, molded steaks, fish cakes, and other molded food patties.

Food processors utilize high-speed molding machines, such as FORMAX F-6, F-12, F-19, F-26 or F-400 reciprocating mold plate forming machines, available from FORMAX, Inc. of Mokena, Ill., U.S.A., for supplying patties to the fast food industry. Prior known high-speed molding machines are also described for example in U.S. Pat. Nos. 3,887,964; 4,372,008; 4,356,595; 4,821,376; and 4,996,743 herein incorporated by reference.

Although heretofore known FORMAX patty-molding machines have achieved commercial success and wide industry acceptance, the present inventors have recognized that needs exist for a forming machine having an even greater durability and an even greater duration of maintenance free operation. The present inventors have recognized that needs for a smoother and quieter patty-forming machine operation.

SUMMARY OF THE INVENTION

The invention provides an improved hydraulic fluid pump system for a patty-forming apparatus, wherein food product is delivered under pressure from a food product pump cylinder by force from a plunger to mold plate cavities. The plunger is driven by force from a hydraulic cylinder into the pump cylinder, wherein the hydraulic cylinder is supplied with hydraulic fluid by a pump. According to one aspect of the invention, the pump is positioned to be at least partially submerged in hydraulic fluid, to be pumped by the pump, within a reservoir.

According to one aspect of the invention, the pump is driven by an electric motor, the electric motor located outside the reservoir and including an output shaft coupled to the pump.

According to another aspect of the invention, the electric motor is fastened to the pump by fasteners that penetrate though a wall of the reservoir, wherein a ring seal is compressed against the wall by the fasteners. The improvement can include a mechanical coupling, and a motor mount surrounding the coupling. The output shaft and the drive shaft are coupled together by the mechanical coupling, wherein the pump is sealed to the reservoir by being fastened to the motor mount to compress the ring seal. The electric motor and the mechanical coupling can thus be located outside a sealed integrity of the reservoir.

According to a further aspect of the invention, the invention pertains to a reciprocating mold plate, patty-forming apparatus wherein food product is delivered under pressure from a food product pump cylinder to mold plate cavities, wherein a plunger is driven during a first phase by force from a hydraulic cylinder from a retracted position distant from the pump cylinder to a ready position initially compressing food product loaded into the pump cylinder, and thereafter the plunger is driven during a second phase by the hydraulic cylinder to deliver food product under pressure into the mold plate cavities, wherein the hydraulic cylinder is supplied with hydraulic fluid during the first phase by a low pressure pump and during the second phase by a high pressure pump. The invention provides a reservoir containing hydraulic fluid to be pumped by the low pressure pump and the high pressure pump. The low pressure pump and the high pressure pump are positioned to be at least partially submerged in hydraulic fluid within the reservoir.

According to a further aspect, an electric motor drives the high pressure pump and the low pressure pump, the electric motor located outside the reservoir and including an output shaft coupled to the low pressure pump and the high pressure pump. The high pressure pump and the low pressure pump can be aligned along a common rotary axis. The low pressure pump and the high pressure pump can have coupled drive shafts, and the output shaft being coupled to one of the drive shafts. The output shaft and the one drive shaft can be coupled together by a mechanical coupling.

The invention provides an improved high-speed patty molding machine that is inherently quiet in operation. The invention also provides an improved high-speed food patty molding machine that is simple and cost effectively manufactured and assembled.

Numerous other advantages and features of the present invention will be become readily apparent from the following detailed description of the invention and the embodiments thereof, and from the accompanying drawings.

DETAILED DESCRIPTION OF THE PREFERRED EMBODIMENTS

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

General Description of the Apparatus

The high-speed food patty molding machine 20 illustrated in the figures comprises a preferred embodiment of the invention. The complete machine is describes in U.S. Ser. No. 10/942,627, filed on the same day as the present application, and herein incorporated by reference. This application also incorporates by reference U.S. Application Ser. No. 60/503,354, filed Sep. 16, 2003 and U.S. Provisional Application Ser. No. 60/515,585, filed Oct. 29, 2003.

The molding machine 20 includes a machine base 21, preferably mounted upon a plurality of feet 22, rollers or wheels. The machine base 21 supports the operating mechanism for machine 20 and can contains hydraulic actuating systems, electrical actuating systems, and most of the machine controls. The machine 20 includes a supply system 24 for supplying moldable food material, such as ground beef, fish, or the like, to the processing mechanisms of the machine.

A control panel 19, such as a touch screen control panel, is arranged on a forward end of the apparatus 20 and communicates with a machine controller.

As generally illustrated in FIGS. 2-6, supply system 24 comprises a large food material storage hopper 25 that opens into the intake of a food pump system 26. The food pump system 26 includes at least two food pumps 61, 62, described in detail hereinafter, that continuously, or intermittently under a pre-selected control scheme, pump food material, under pressure, into a manifold 27 flow-connected to a cyclically operated molding mechanism 28.

In the operation of machine 20, a supply of ground beef or other moldable food material is deposited into hopper 25 from overhead. An automated refill device (not shown) can be used to refill the hopper when the supply of food product therein is depleted. The floor of hopper 25 is defined by a conveyor belt 31 of a conveyor 30. The conveyor belt provides a top surface 31a for moving the food material longitudinally of the hopper 25 to a hopper forward end 25a.

The food material is moved by supply system 24 into the intake of plunger pumps 61, 62 of pumping system 26. The pumps 61, 62 of system 26 operate in overlapping alteration to each other; and at any given time when machine 20 is in operation, at least one of the pumps is forcing food material under pressure into the intake of manifold 27.

Figure 1:
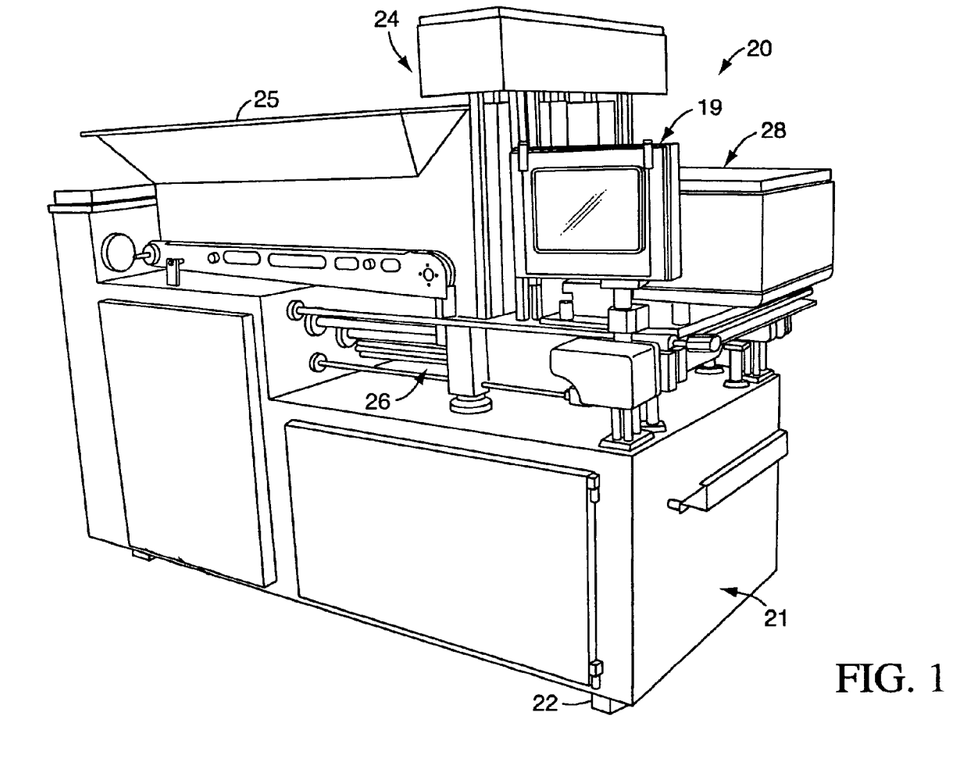
FIG. 1 is a perspective view of a patty-forming machine of the present invention.
Figure 1A:
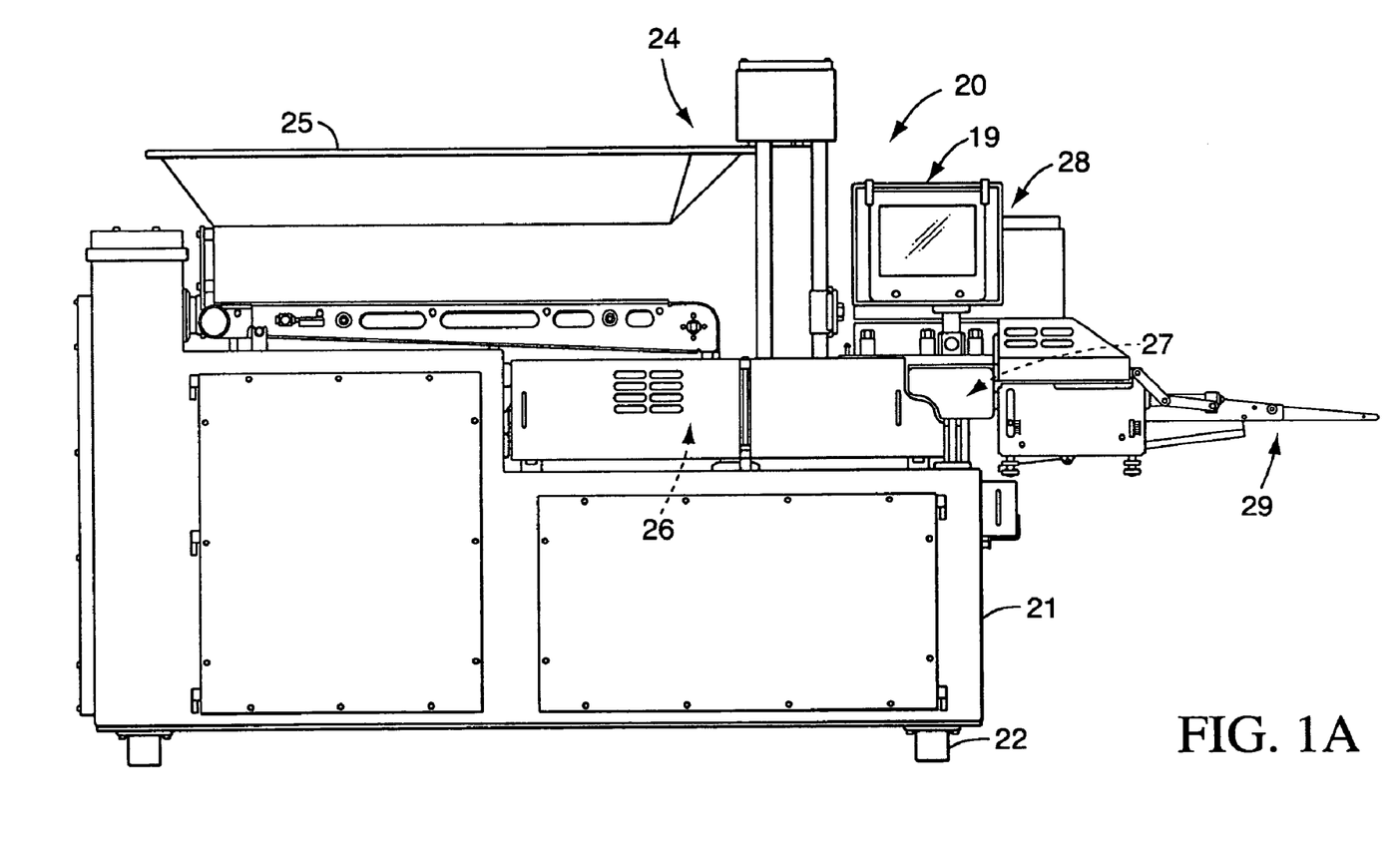
FIG. 1A is a plan view of the patty-forming machine of FIG. 1.

The manifold 27 comprises a path for feeding the food material, still under relatively high pressure, into the molding mechanism 28. Molding mechanism 28 operates on a cyclic basis, first sliding a multi-cavity mold plate 32 into a receiving position over manifold 27 (FIG. 9A) and then away from the manifold to a discharge position (FIG. 9B) aligned with a series of knock out plungers such as knock out cups 33. When the mold plate 32 is at its discharge position, knock out cups 33 are driven downwardly as indicated by 33A in FIG. 2, discharging hamburgers or other molded patties from machine 20. The molded patties are deposited onto a conveyor 29 (FIG. 1A), to be transported away from the apparatus 20.

Food Supply System

The food supply system 24 and associated hopper 25 are illustrated in FIGS. 2-6. As seen, the conveyor belt 31 spans completely across the bottom of hopper 25, around an end of idler roller or pulley 35 and drive roller or pulley 36, the lower portion of the belt being engaged by a tensioning roller 37. In some cases the tensioning roller 37 may not be necessary, and can be eliminated. A drum motor (not visible) is provided within the drive roller 36 for rotating the drive roller.

The forward end 25a of hopper 25 communicates with a vertical pump 38 having an outlet 39 at least partly open into a pump intake manifold chamber 41. A vertically oriented frame 42 extends above hopper 25 adjacent the right-hand side of the outlet 39. The frame 42 supports a motor housing 40. A support plate 43 is affixed to the upper portion of frame 42 extending over the outlet 39 in hopper 25. The frame comprises four vertical tie rods 44a surrounded by spacers 44b (FIG. 5).

Figure 5:
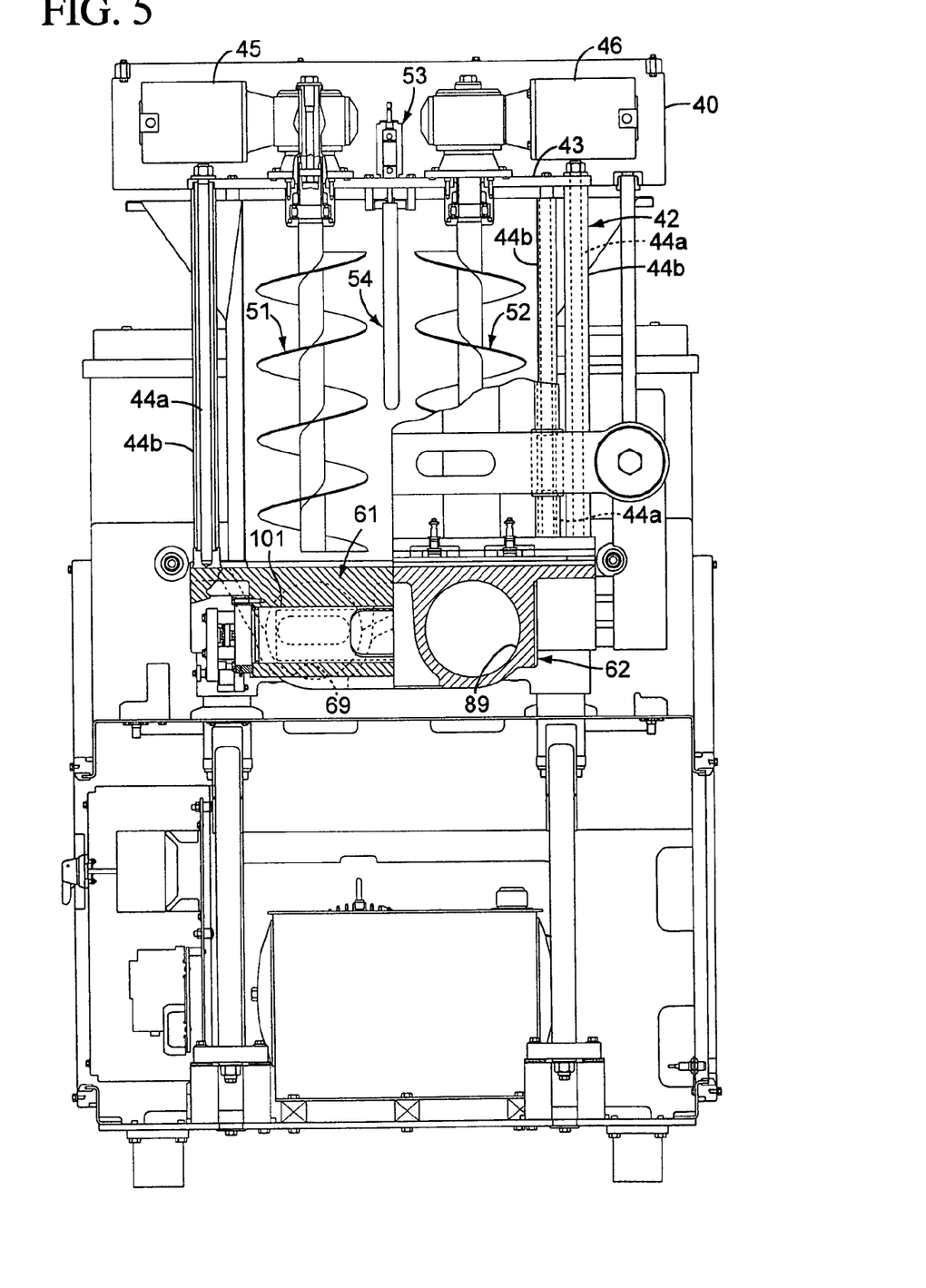
FIG. 5 is a sectional view taken generally along line 5-5 of FIG. 2, with some components and/or panels removed for clarity.

As shown in FIG. 5, the vertical pump 38 comprises two feed screw motors 45, 46 that drive feed screws 51, 52. The two electrical feed screw motors 45, 46 are mounted upon support plate 43 within the motor housing 40. Motor 45 drives the feed screw 51 that extends partly through opening 39 in alignment with a pump plunger 66 of the pump 61. Motor 46 drives the feed screw 52 located at the opposite side of hopper 25 from feed screw 51, and aligned with another pump plunger 68 of the pump 62.

A level sensing mechanism 53 is located at the outlet end of hopper 25 comprising an elongated sensing element 54. As the moldable food material is moved forwardly in the hopper 25, it may accumulate to a level in which it engages the sensing element 54. When this occurs, a sensor sends a signal to the machine control to interrupt the drive for the roller 36 of conveyor 30. In this manner the accumulation of food material at the forward end 25a of hopper 25 is maintained at an advantageous level.

Figure 2:
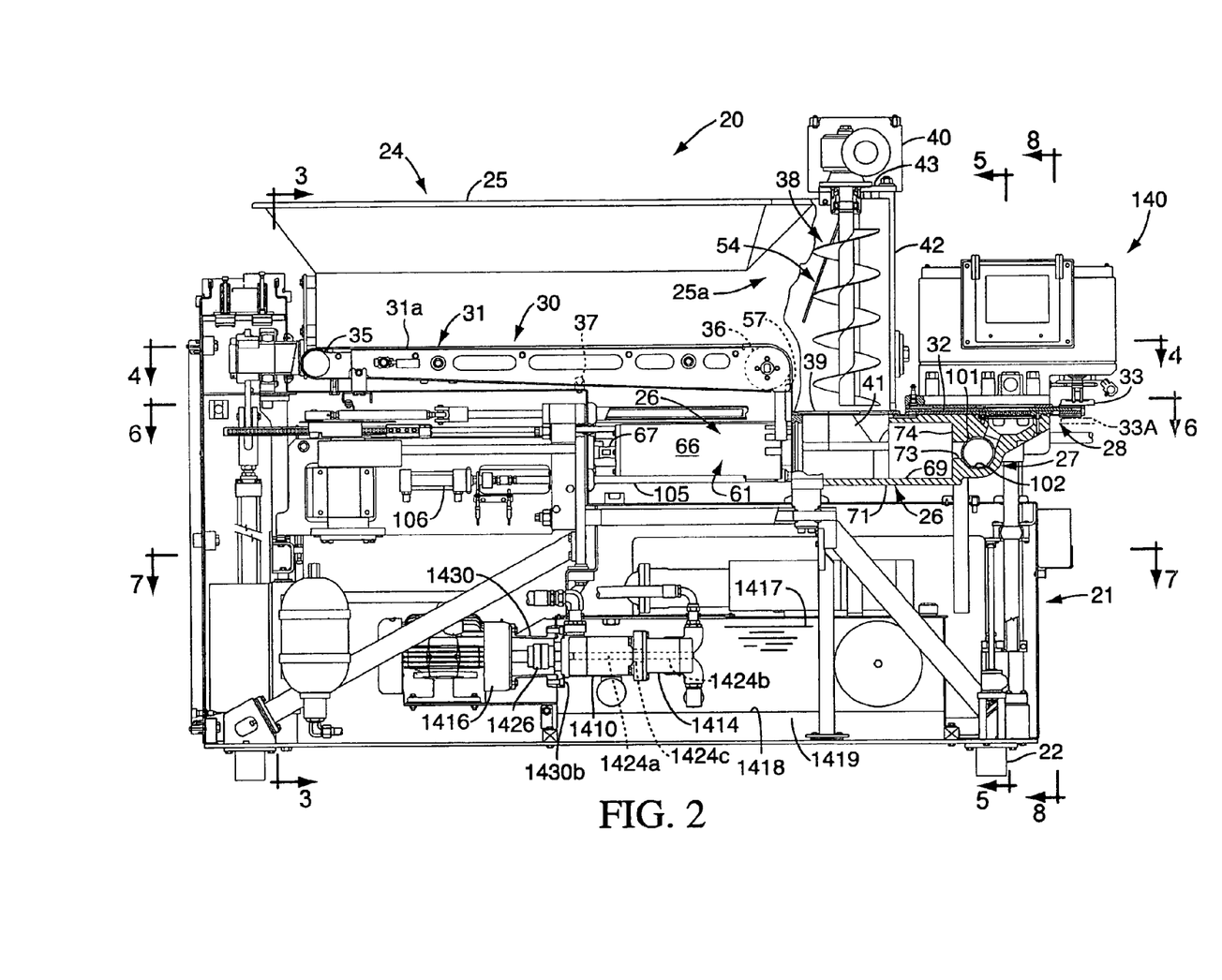
FIG. 2 is a longitudinal sectional view of the patty-forming machine of FIG. 1, with some components and/or panels removed for clarity.

When machine 20 is in operation, the feed screw motor 45 is energized whenever plunger 66 is withdrawn to the position shown in FIG. 2, so that feed screw 51 supplies meat from hopper 25 downwardly through outlet 39 into one side of the intake 41 of the food pumping system 26. Similarly, motor 46 actuates the feed screws 52 to feed meat to the other side of intake 41 whenever plunger 68 of the pump 62 is withdrawn. In each instance, the feed screw motors 45, 46 are timed to shut off shortly after the plunger is fully retracted, avoiding excessive agitation of the meat. As the supply of food material in the outlet 39 is depleted, the conveyor belt 31 continuously moves food forwardly in the hopper and into position to be engaged by the feed screws 51, 52. If the level of meat at the outlet 39 becomes excessive, conveyor 31 is stopped, as described above, until the supply at the hopper outlet is again depleted.

The wall of the outlet 39 immediately below conveyor drive rollers 36 comprises a belt wiper plate 57 that continuously engages the surface of the conveyor 31 to prevent leakage of the food material 38 from the hopper at this point.

Food Pump System

Figure 6:
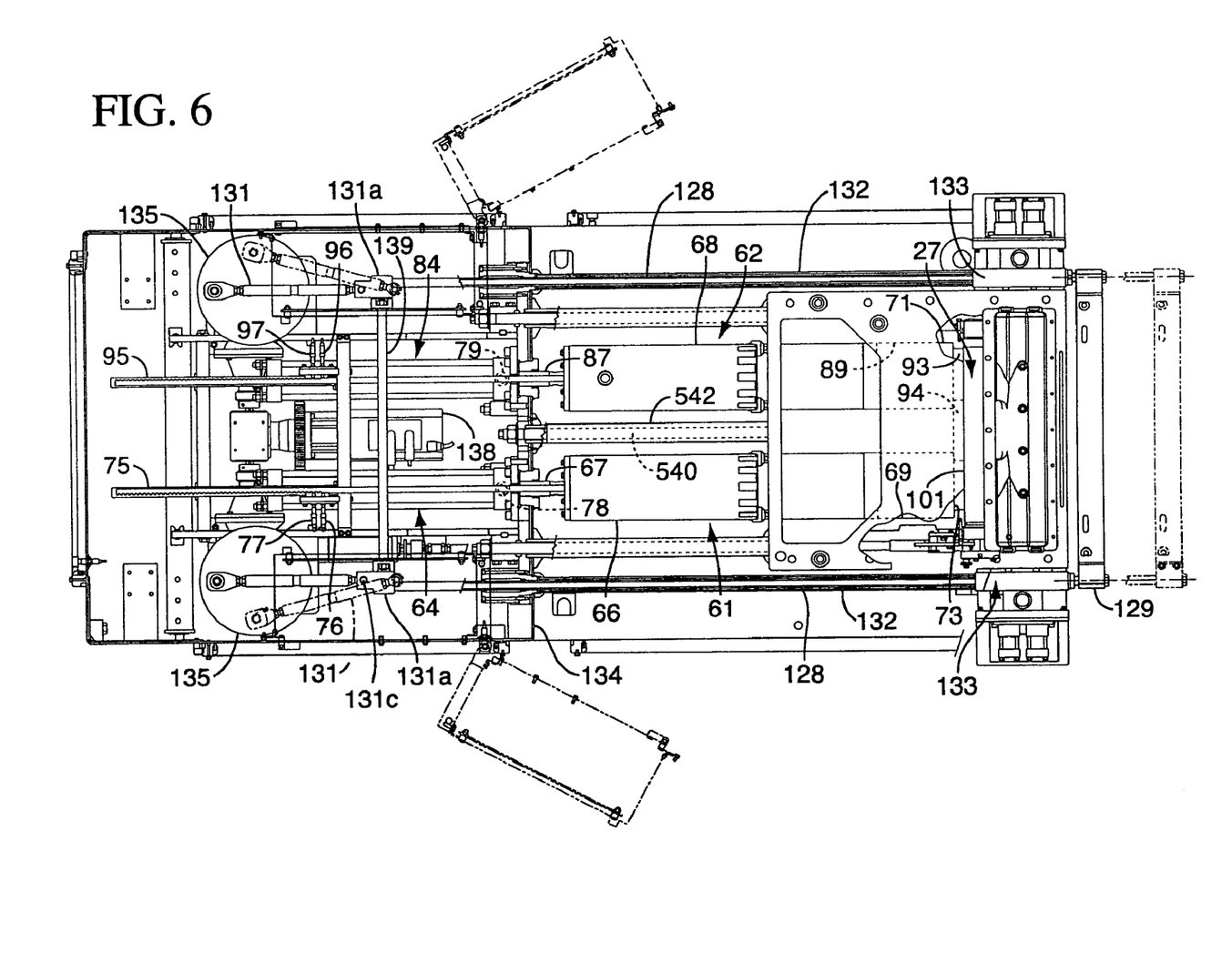
FIG. 6 is a sectional view taken generally along line 6-6 of FIG. 2, with some components and/or panels removed for clarity.
Figure 7:
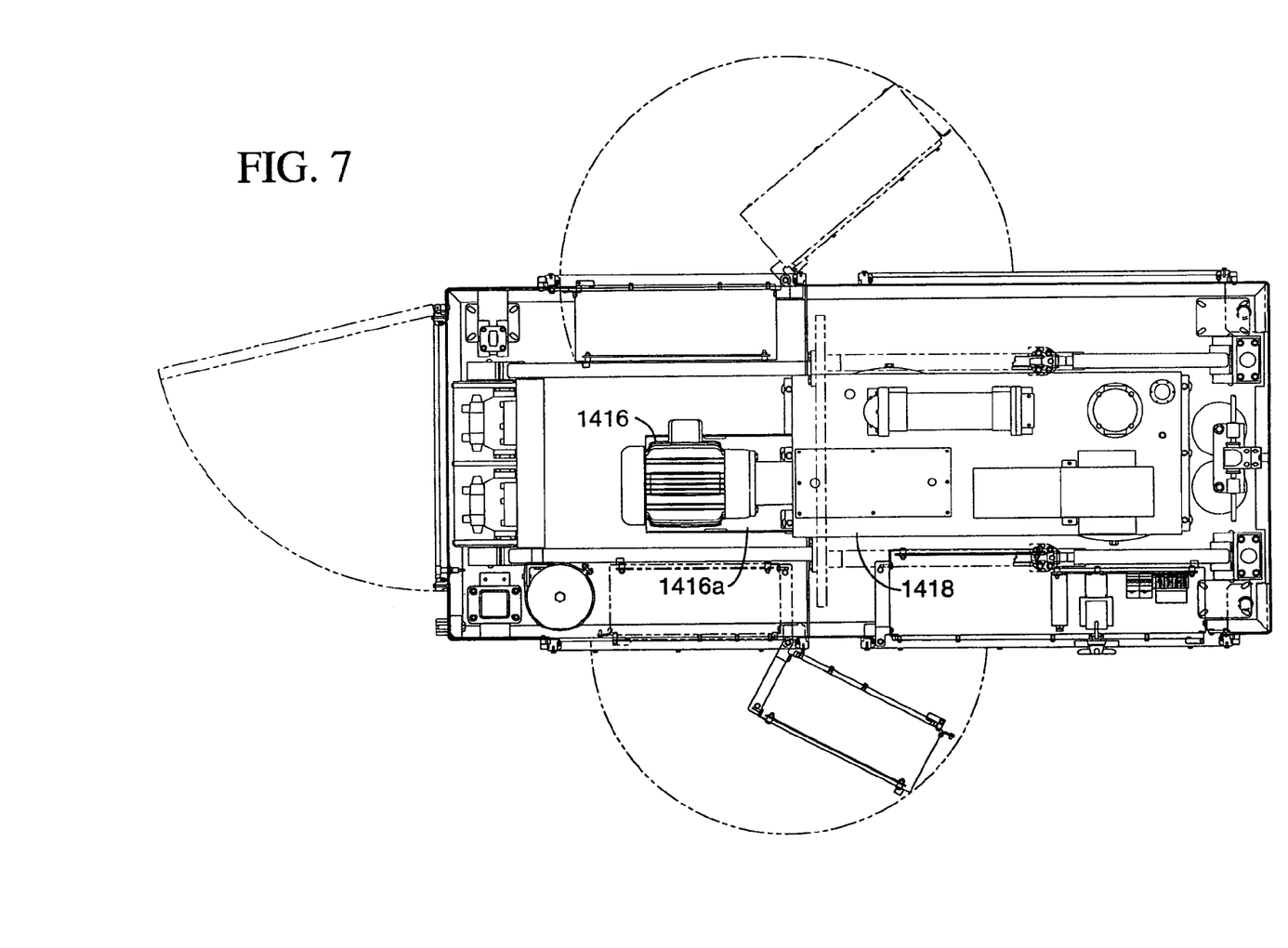
FIG. 7 is a sectional view taken generally along line 7-7 of FIG. 2, with some components and/or panels removed for clarity.
Figure 8:
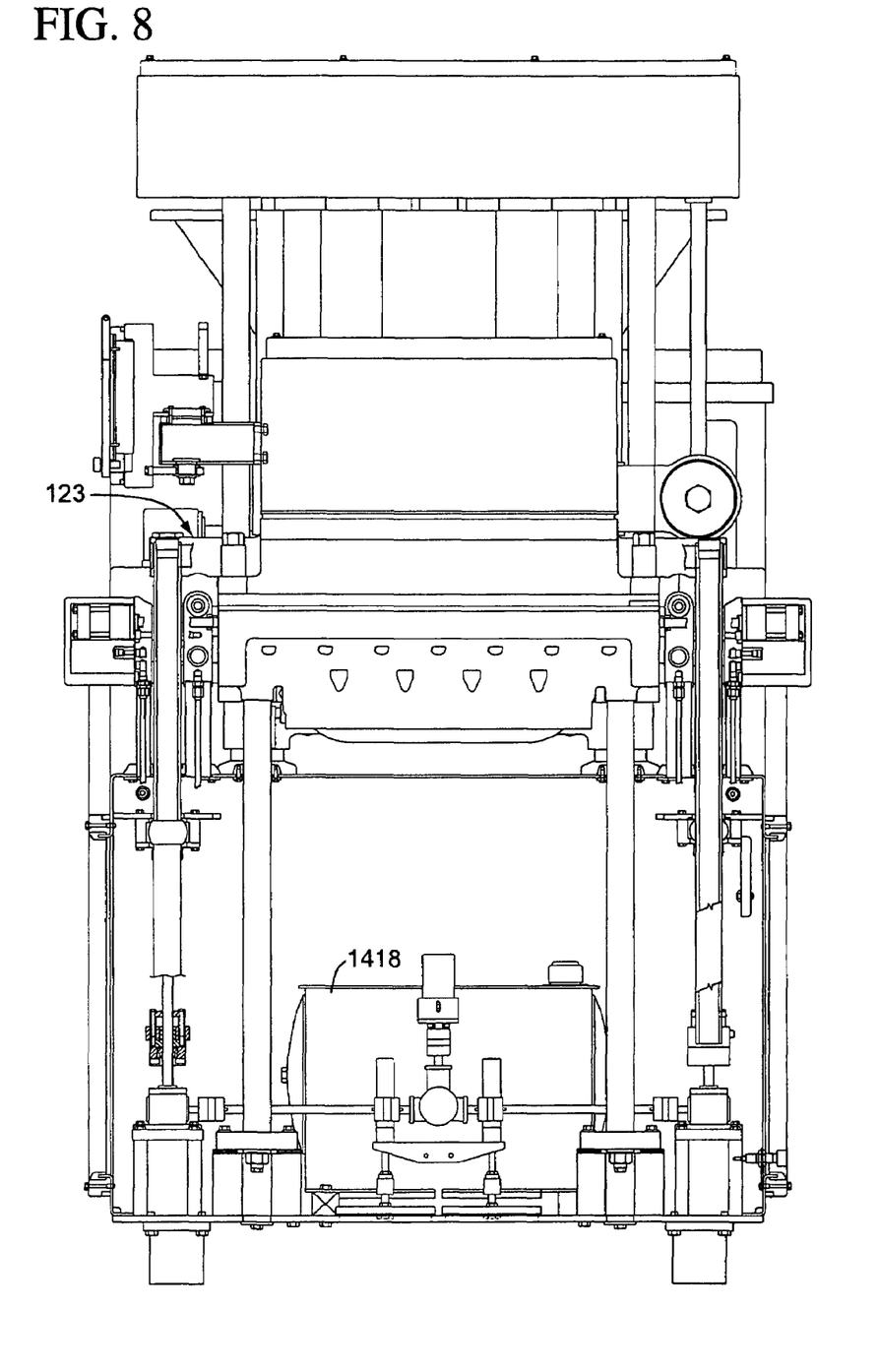
FIG. 8 is a sectional view taken generally along line 8-8 of FIG. 2, with some components and/or panels removed for clarity.

The food pump system 26 of molding machine 20 is best illustrated in FIGS. 2 and 6. Pump system 26 comprises the two reciprocating food pumps 61, 62 mounted on the machine base 21. The first food pump 61 includes a hydraulic cylinder 64. The piston in cylinder 64 (not shown) is connected to an elongated piston rod 67; the outer end of the elongated piston rod 67 is connected to the large plunger 66. The plunger 66 is aligned with a first pump cavity 69 formed by a pump cavity enclosure or housing 71 that is divided into two pump chambers. The forward wall 74 of pump cavity 69 has a relatively narrow slot 73 that communicates with the pump manifold 27 as described more fully hereinafter.

Preferably, the pump housing 71 and the valve manifold 27 are cast or otherwise formed as a one piece stainless steel part.

The second food pump 62 is essentially similar in construction to pump 61 and comprises a hydraulic cylinder 84. Cylinder 84 has an elongated piston rod 87 connected to the large plunger 68 that is aligned with a second pump cavity 89 in housing 71. The forward wall 94 of pump cavity 89 includes a narrow elongated slot 93 communicating with manifold 27.

Advantageously, the plungers 66, 68 and the pump cavities 69, 89 have corresponding round cross sections for ease of manufacturing and cleaning.

In operation, the first pump 61 pumps the moldable food material into manifold 27 and the second pump 62 receives a supply of the moldable food material for a subsequent pumping operation. Pump 61 begins its pumping stroke, and compresses food product in pump cavity 69, forcing the moldable food material through slot 73 into manifold 27. As operation of molding machine 20 continues, pump 61 advances plunger 66 to compensate for the removal of food material through manifold 27. The pump can maintain a constant pressure on the food material in the chamber 69 during the molding cycle, or preferably can provide a pre-selected pressure profile over the molding cycle such as described in U.S. Pat. No. 4,356,595, incorporated herein by reference, or as utilized in currently available FORMAX machines.

When plunger 66 is near the end of its permitted range of travel, pump 62 is actuated to advance plunger 68 through pump cavity 89, compressing the food material in the second pump cavity in preparation for feeding the food material from the cavity into manifold 27.

When the food in the second pump cavity 89 is under adequate pressure, the input to manifold 27 is modified so that subsequent feeding of food product to the manifold is effected from the second pump cavity 89 with continuing advancement of plunger 68 of the second pump 62. After the manifold intake has been changed over, pump 61 is actuated to withdraw plunger 66 from cavity 69.

Thereafter, when plunger 68 is near the end of its pressure stroke into pump cavity 89, the changeover process described immediately above is reversed. Pump 61 begins its compression stroke, manifold 27 is changed over for intake from pump 61, and pump 62 subsequently retracts plunger 68 back to the supply position to allow a refill of pump cavity 89. This overlapping alternating operation of the two pumps 61, 62 continues as long as molding machine 20 is in operation.

The valve manifold 27, shown in FIGS. 2 and 6, holds a manifold valve cylinder or tube valve 101 fit into an opening 102 in housing 71 immediately beyond the pump cavity walls 74 and 94.

According to the illustrated embodiment, valve cylinder 101 includes two longitudinally displaced intake slots 107 and 108 alignable with the outlet slots 73 and 93, respectively, in the pump cavity walls 74 and 94. Slots 107 and 108 are angularly displaced from each other to preclude simultaneous communication between the manifold and both pump cavities 69 and 89. Cylinder 101 also includes an elongated outlet slot 109. The valve cylinder outlet slot 109 is generally aligned with a slot 111 (see FIG. 9A) in housing 71 that constitutes a feed passage for molding mechanism 28.

One end wall of valve cylinder 101 includes an externally projecting base end 103 that is connected to a drive linkage 104, in turn connected to the end of the piston rod 105 of a hydraulic actuator cylinder 106 (FIG. 2).

When the pump 61 is supplying food material under pressure to molding mechanism 28, actuator cylinder 106 has retracted piston rod 105 to the inner limit of its travel, angularly orienting the manifold valve cylinder 101. With cylinder 101 in this position, its intake slot 107 is aligned with the outlet slot 73 from pump cavity 69 so that food material is forced under pressure from cavity 69 through the interior of valve cylinder 101 and out of the valve cylinder outlet slot 109 through slot 111 to the molding mechanism 27. On the other hand, the second intake slot 108 of valve cylinder 101 is displaced from the outlet slot 93 for the second pump cavity 89. Consequently, the food material forced into the interior of valve cylinder 101 from pump cavity 69 cannot flow back into the other pump cavity 89.

The valve cylinder 101 and corresponding slots or openings can alternately be as described in U.S. Provisional Application 60/571,368, filed May 14, 2004, or U.S. Ser. No. 10/942,754, now U.S. Pat. No. 7,125,245, filed on the same day as the present invention, both herein incorporated by reference. According to these disclosures, rather than a single outlet 109, two rows of progressively sized outlets, smallest closest to the active pump, are alternately opened to plural openings that replace the single opening 111.

Molding Mechanism

Figure 9A:
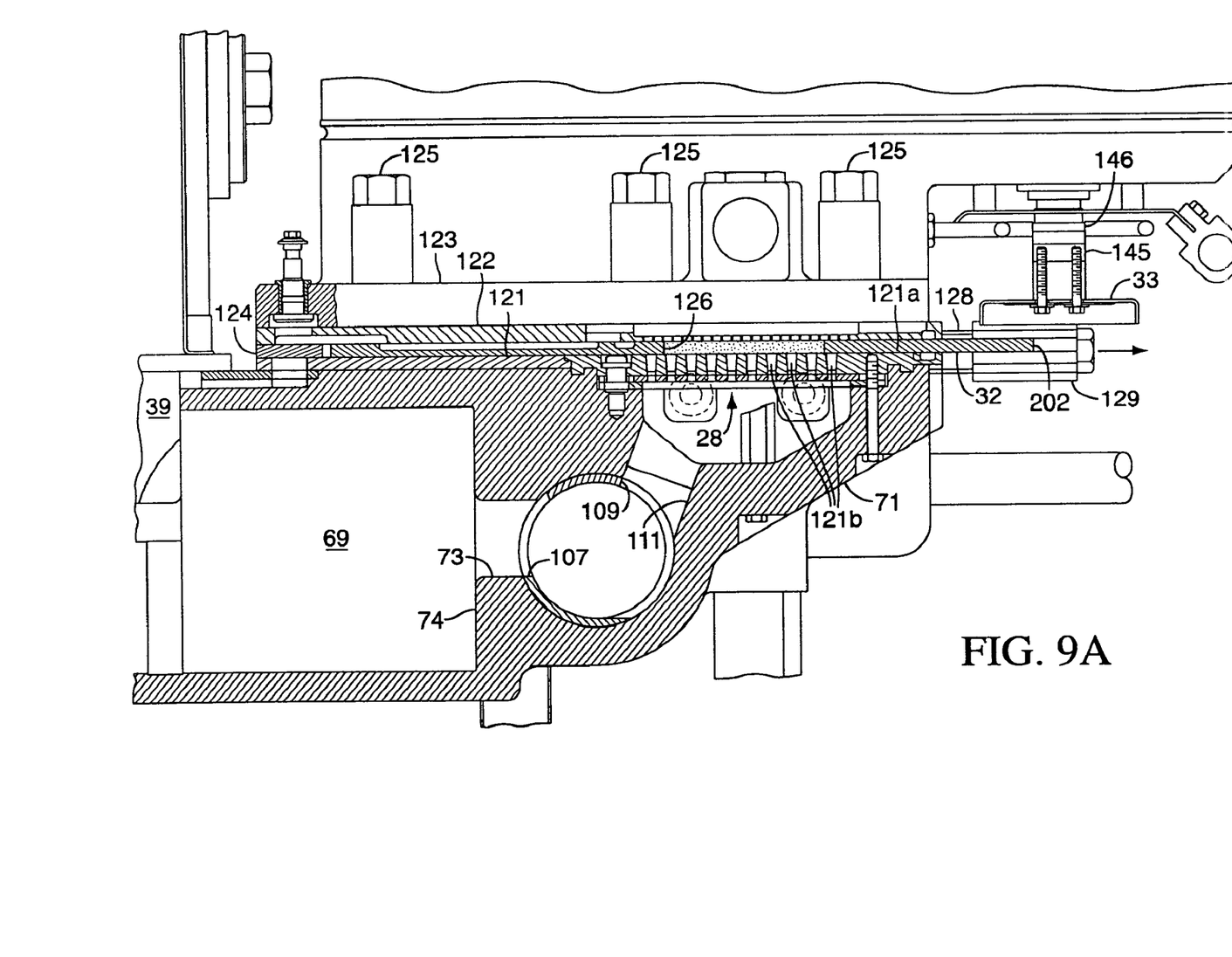
FIG. 9A is an enlarged fragmentary sectional views taken from FIG. 2, showing the machine configuration with the mold plate in a cavity fill position.

As best illustrated in FIG. 9A, the upper surface of the housing 71 that encloses the pump cavities 69 and 89 and the manifold 27 carries a support plate or wear plate 121 and a fill plate 121a that forms a flat, smooth mold plate support surface. The mold support plate 121 and the fill plate 121a may be fabricated as two plates as shown or a single plate bolted to or otherwise fixedly mounted upon housing 71. The fill plate 121a includes apertures or slots that form the upper portion of the manifold outlet passage 111. In the apparatus illustrated, a multi fill orifice type fill plate 121a is utilized. A simple slotted fill plate is also encompassed by the invention.

Mold plate 32 is supported upon plates 121, 121a. Mold plate 32 includes a plurality of individual mold cavities 126 extending across the width of the mold plate and alignable with the manifold outlet passageway 111. Although a single row of cavities is shown, it is also encompassed by the invention to provide plural rows of cavities, stacked in aligned columns or in staggered columns. A cover plate 122 is disposed immediately above mold plate 32, closing off the top of each of the mold cavities 126. A mold cover casting or housing 123 is mounted upon cover plate 122. The spacing between cover plate 122 and support plate 121 is maintained equal to the thickness of mold plate 32 by support spacers 124 mounted upon support plate 121. Cover plate 122 rests upon the spacers 124 when the molding mechanism is assembled for operation. Cover plate 122 and mold cover casting 123 are held in place by six mounting bolts, or nuts tightened on studs, 125.

The cover plate 122 can be configured as a breather plate as part of a molding mechanism air-and-fines removal system, such as described in U.S. Ser. No. 10/942,755, and filed on the same day as the present application, and herein incorporated by reference.

Figure 3:
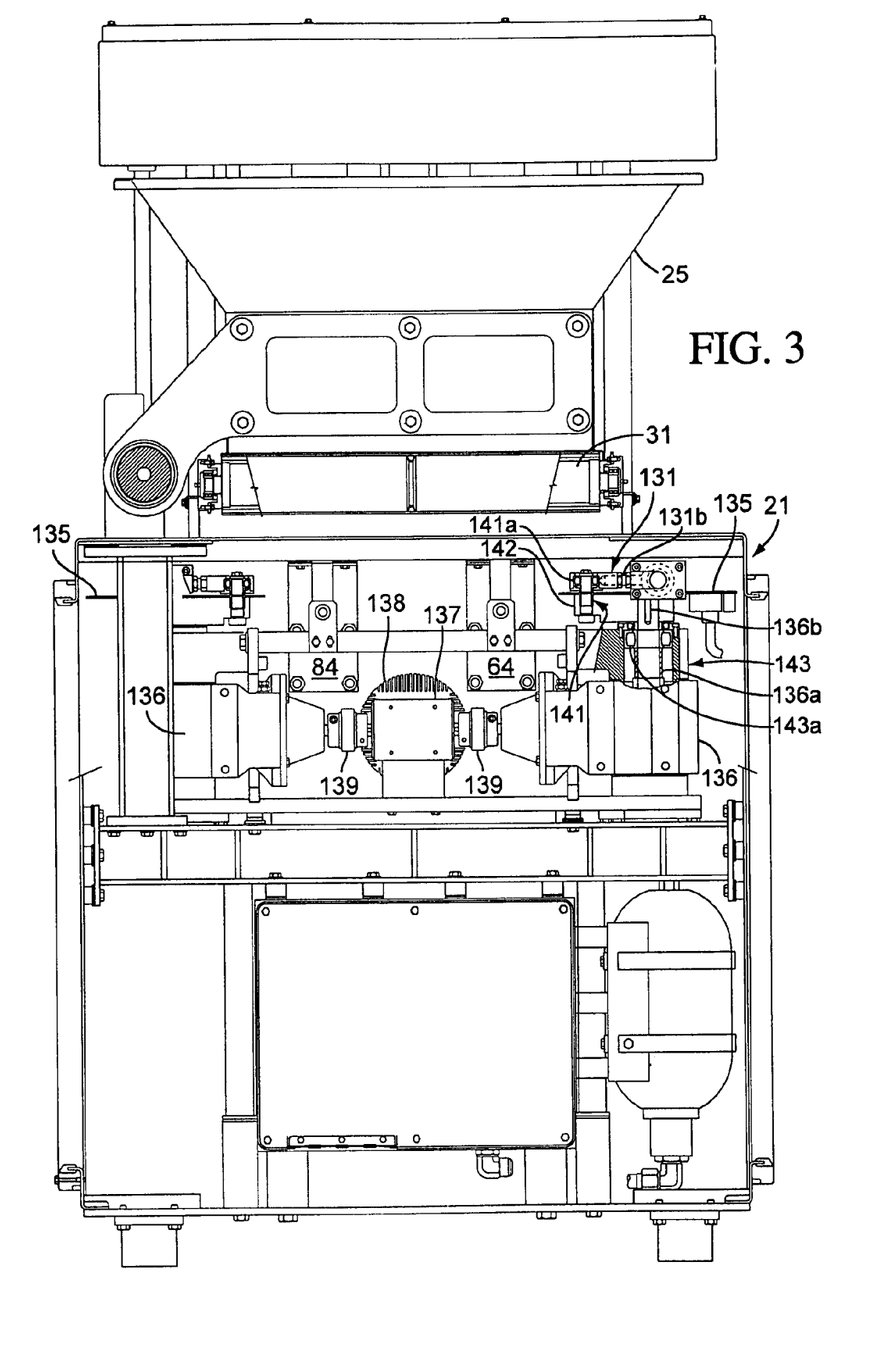
FIG. 3 is a sectional view taken generally along line 3-3 of FIG. 2, with some components and/or panels removed for clarity.
Figure 4:
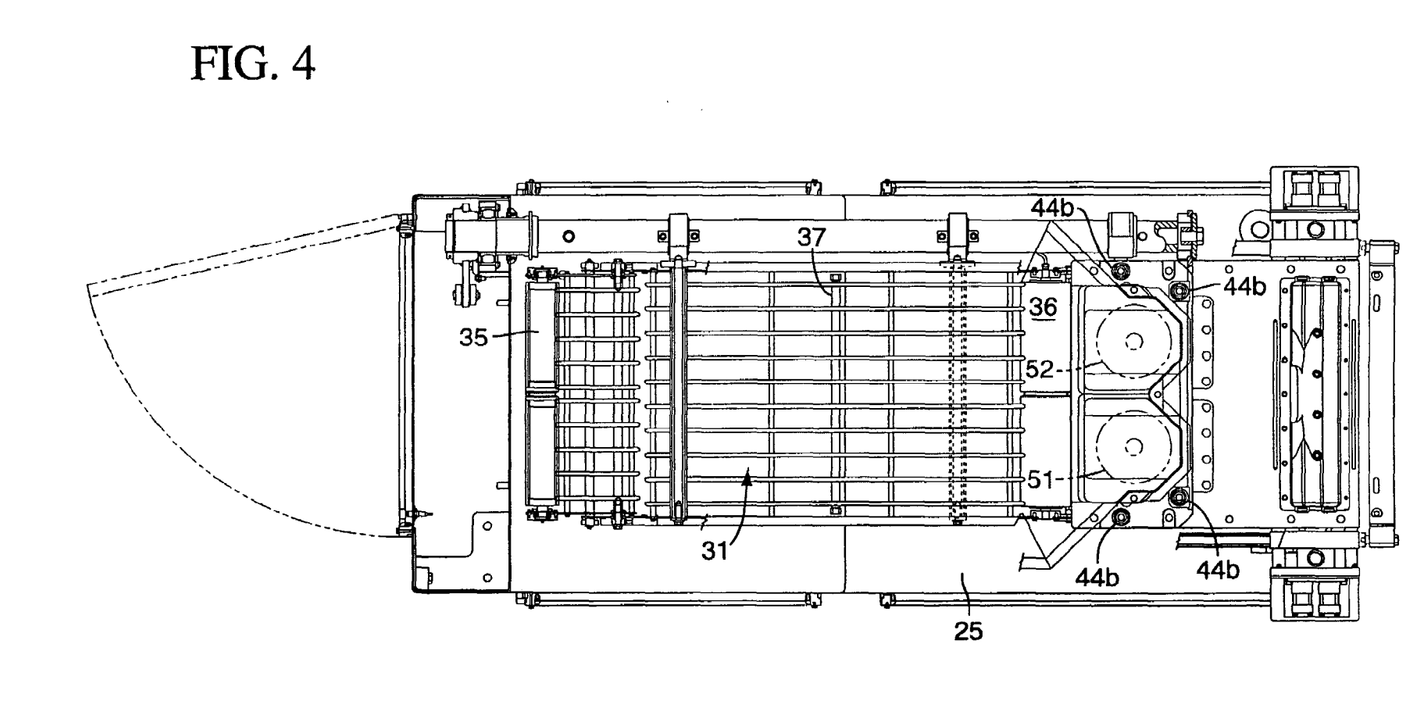
FIG. 4 is a sectional view taken generally along line 4-4 of FIG. 2, with some components and/or panels removed for clarity.

As best illustrated in FIGS. 3 and 6 mold plate 32 is connected to drive rods 128 that extend alongside housing 71 and are connected at one end to a transverse bar 129. The other end of each drive rod 128 is pivotally connected to a connecting link 131 via a coupling plate 131a and a pivot connection 131c, shown in FIG. 10. The pivot connection 131c can include a bearing (not visible in the figures) surrounding a pin 131d within an apertured end 131e of the connecting link 131. The pin 131d includes a cap, or carries a threaded nut, on each opposite end to secure the crank arm to the coupling plate 131a.

Figure 10:
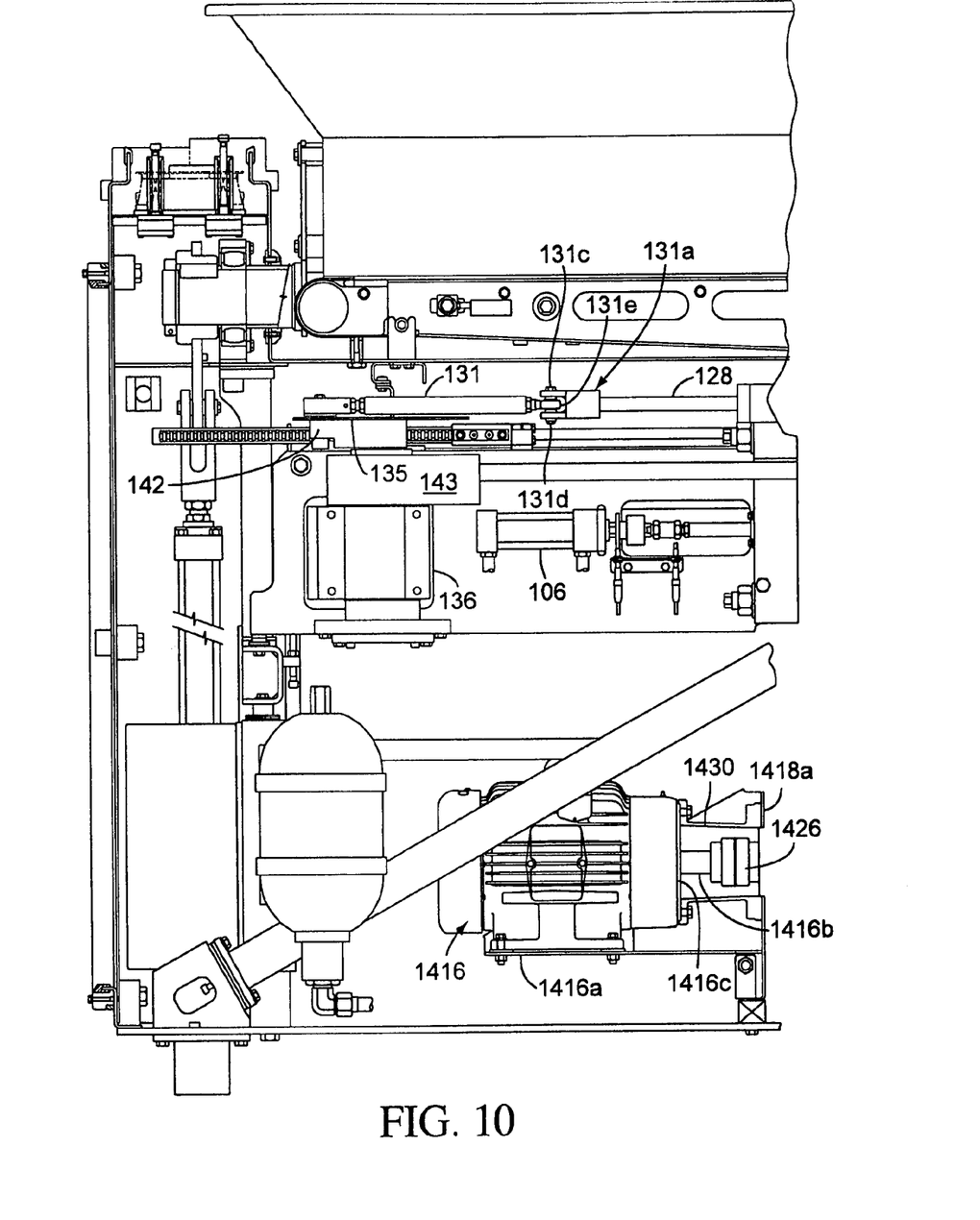
FIG. 10 is an enlarged sectional view taken from the left side of FIG. 2, with some components and/or panels removed for clarity.

Each drive rod 128 is carried within a guide tube 132 that is fixed between a wall 134 and a front bearing housing 133. The connecting links 131 are each pivotally connected to a crank arm 142 via a pin 141 that is journaled by a bearing 141a that is fit within an end portion of the connecting link 131. The pin crank arm 142 is fixed to, and rotates with, a circular guard plate 135. The pin 141 has a cap, or carries a threaded nut, on each opposite end that axially fixes the connecting link 131 to the crank arm 142 and the circular guard plate 135. The connecting link 131 also includes a threaded portion 131b to finely adjust the connecting link length.

The crank arms 142 are each driven by a right angle gear box 136 via a "T" gear box 137 having one input that is driven by a precise position controlled motor 138 and two outputs to the gearboxes 136. The "T" gear box 137 and the right angle gear boxes 136 are configured such that the crank arms 142 rotate in opposite directions at the same rotary speed.

The precise position controlled motor can be a 6-7.5 HP totally enclosed fan cooled servo motor. The servo motor is provided with two modules: a power amplifier that drives the servo motor, and a servo controller that communicates precise position information to the machine controller.

The controller and the servo motor 138 are preferably configured such that the servo motor rotates in an opposite rotary direction every cycle, i.e., clockwise during one cycle, counterclockwise the next cycle, clockwise the next cycle, etc.

A bearing housing 143 is supported on each gearbox 136 and includes a rotary bearing 143a therein to journal an output shaft 136a of the gear box 136. The output shaft 136a is fixed to the crank arm 142 by a clamp arrangement formed by legs of the crank arm 142 that surround the output shaft and have fasteners that draw the legs together to clamp the output shaft between the legs (not shown), and a longitudinal key (not shown) fit into a keyway 136b on the output shaft and a corresponding keyway in the crank arm 142 (not shown).

A tie bar 139 is connected between the rods 128 to ensure a parallel reciprocation of the rods 128. As the crank arms 142 rotate in opposite rotational directions, the outward centrifugal force caused by the rotation of the crank arms 142 and the eccentric weight of the attached links 131 cancels, and separation force is taken up by tension in the tie bar 139.

One circular guard plate 135 is fastened on top of each crank arm 142. The pin 141 can act as a shear pin. If the mold plate should strike a hard obstruction, the shear pin can shear by force of the crank arm 142. The guard plate 135 prevents an end of the link 131 from dropping into the path of the crank arm 142.

During a molding operation, the molding mechanism 28 is assembled as shown in FIGS. 2 and 9A, with cover plate 122 tightly clamped onto spacers 124.

The knockout cups 33 are driven by a knockout drive mechanism as described in U.S. Ser. No. 10/943,809, filed on the same day as the present application, and herein incorporated by reference.

Figure 9B:
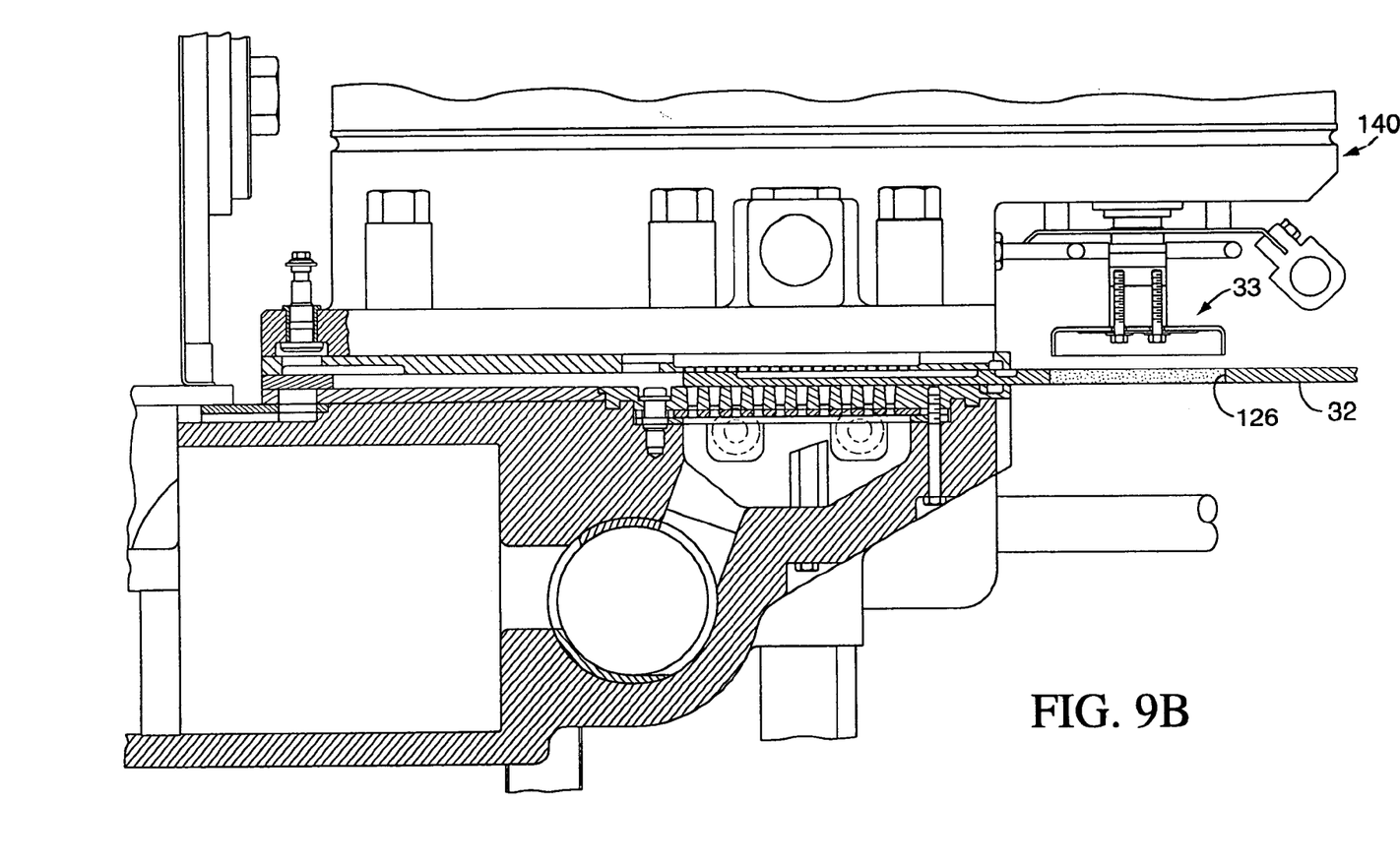
FIG. 9B is an enlarged fragmentary sectional views taken from FIG. 2, showing the machine configuration with the mold plate in a patty discharge position.

In each cycle of operation, knockout cups 33 are first withdrawn to the elevated position as shown in FIG. 9B. The drive for mold plate 32 then slides the mold plate from the full extended position to the mold filling position illustrated in FIGS. 2 and 9A, with the mold cavities 126 aligned with passageway 111.

During most of each cycle of operation of mold plate 32, the knockout mechanism remains in the elevated position, shown in FIG. 9B, with knockout cups 33 clear of mold plate 32. When mold plate 32 reaches its extended discharge position as shown in FIG. 9B the knockout cups 33 are driven downward to discharge the patties from the mold cavities.

The discharged patties may be picked up by the conveyor 29 or may be accumulated in a stacker. If desired, the discharged patties may be interleaved with paper, by an appropriate paper interleaving device. Such a device is disclosed in U.S. Pat. No. 3,952,478, or U.S. Ser. No. 60/540,022, filed on Jan. 27, 2004, both incorporated herein by reference. In fact, machine 20 may be used with a wide variety of secondary equipment, including steak folders, bird rollers, and other such equipment.

Hydraulic System

The apparatus incorporates a hydraulic system such as described in U.S. Pat. No. 3,887,964 or Re 30,096, herein incorporated by reference, or as currently used on FORMAX F-26 machines. In such systems a lower pressure, higher volume hydraulic pump and a higher pressure, lower volume hydraulic pump are used. The lower pressure pump is useful for moving the hydraulic piston and the associated plunger a large distance such as from a retracted position to a position wherein the food product is initially compressed within the cylinder by the plunger. The higher pressure pump is useful to move the plunger an incremental distance each mold plate reciprocation cycle, to deliver food product under pressure into the mold cavities.

One improvement in the present invention is the fact that the lower pressure pump 1410 and the higher pressure hydraulic pump 1414 are both driven by a common electric motor 1416, in series on the motor output shaft, wherein the pumps 1410, 1414 are located in the hydraulic fluid reservoir 1418, submerged below a hydraulic fluid fill line 1417. By being submerged, the pumps run quieter, cooler and more efficiently.

The motor 1416 is preferably a 15 HP totally enclosed, fan cooled motor. As shown in FIG. 10, the motor 1416 is supported on a platform 1416a that is supported in cantilever fashion from the reservoir 1416. The motor includes a rotary output shaft 1416b.

The reservoir 1418 is preferably a stainless steel tank. A bottom 1419 of the reservoir is advantageously visible for inspection and cleaning and sanitizing.

Figure 11:
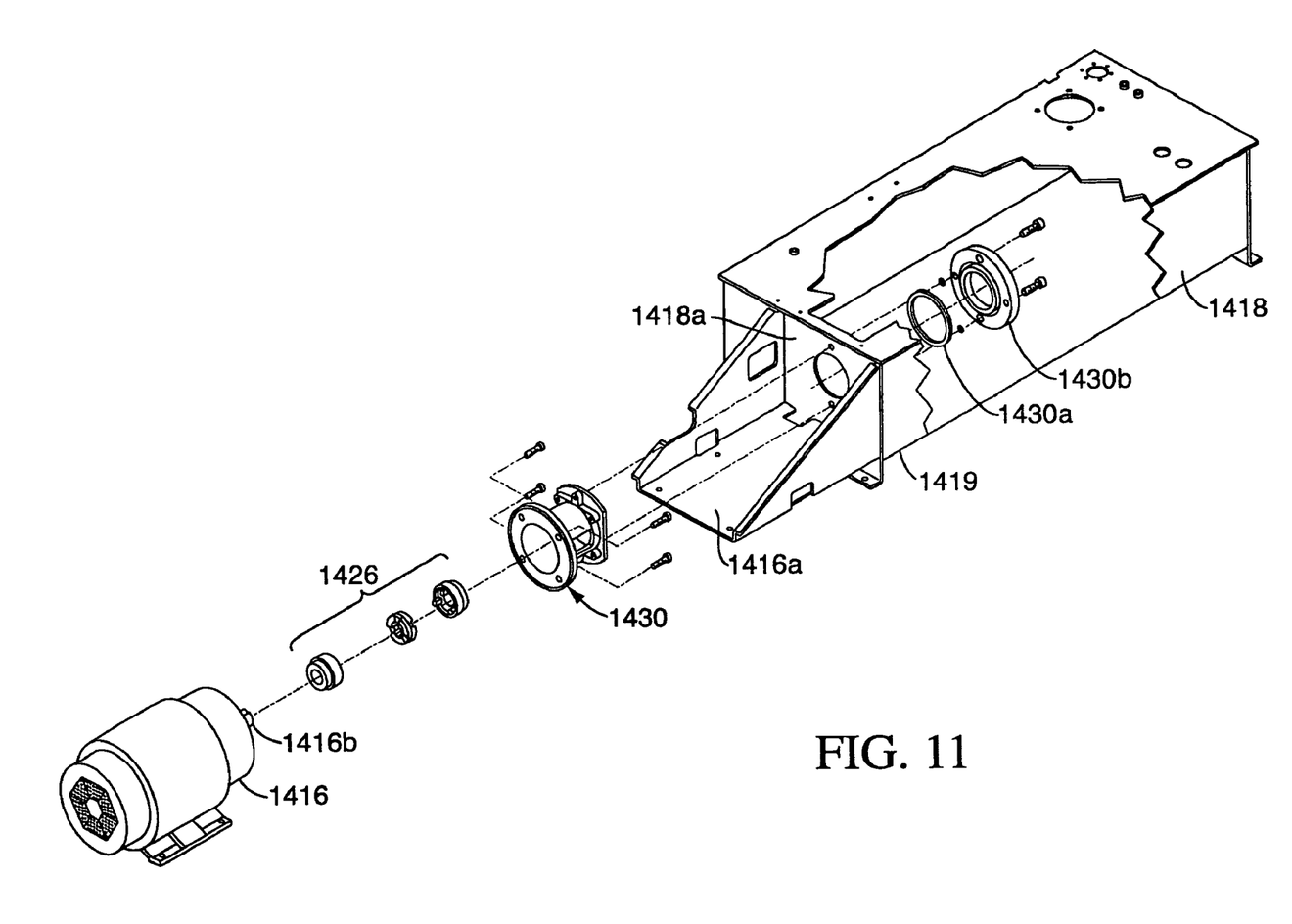
FIG. 11 is an exploded perspective view of a portion of FIG. 2.

As shown in FIGS. 2, 10 and 11 the pumps 1410 and 1414 have pump shafts 1424a, 1424b connected by a coupling 1424c, shown dashed. The pump shaft 1424a is coupled to the motor output shaft 1416b by a mechanical coupling 1426. A motor mount 1430 surround the coupling 1426 as it is sealed to a wall 1418a of the reservoir 1418 by a ring seal 1430a clamped between a backing ring 1430b that is fastened through the wall 1418a to the motor mount 1430. The lower pressure pump 1410 is bolted to the backing ring in sealed fashion.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. In a reciprocating mold plate, patty-forming apparatus wherein food product is delivered under pressure from a food product pump cylinder to mold plate cavities, wherein a plunger is driven during a first phase by force from a hydraulic cylinder from a retracted position distant from the pump cylinder to a ready position initially compressing food product loaded into said pump cylinder, and thereafter the plunger is driven during a second phase by said hydraulic cylinder to deliver food product under pressure into the mold plate cavities, wherein said hydraulic cylinder is supplied with hydraulic fluid during said first phase by a low pressure pump and during said second phase by a high pressure pump, the improvement comprising:

a reservoir containing hydraulic fluid to be pumped by said low pressure pump and said high pressure pump, wherein said low pressure pump and said high pressure pump have pump casings that are positioned within said reservoir to be at least partially submerged in hydraulic fluid within said reservoir, said low-pressure pump and said high pressure pump configured to draw hydraulic fluid from said reservoir and pump said hydraulic fluid out of said reservoir.

2. The improvement according to claim 1, comprising an electric motor and wherein said high pressure pump and said low pressure pump are driven by said electric motor, said electric motor located outside said reservoir and including an output shaft coupled to said low pressure pump and said high pressure pump.

3. The improvement according to claim 2, wherein said high pressure pump and said low pressure pump are aligned along a common rotary axis.

4. The improvement according to claim 1, comprising an electric motor having an output shaft, said electric motor located outside said reservoir and having a sealed integrity to said reservoir, said output shaft penetrating said reservoir and coupled to said low pressure and said high pressure pumps.

5. The improvement according to claim 4, wherein said low pressure pump and said high pressure pump have coupled drive shafts, and said output shaft is coupled to one of said drive shafts.

6. The improvement according to claim 5, comprising a mechanical coupling, said output shaft and said one drive shaft coupled together by said mechanical coupling.

7. The improvement according to claim 1, comprising an electric motor and a mechanical coupling, and wherein said high pressure pump and said low pressure pump are driven by said electric motor via said mechanical coupling, said electric motor located outside said reservoir.

8. In a reciprocating mold plate, patty-forming apparatus wherein food product is delivered under pressure from a food product pump cylinder to mold plate cavities, wherein a plunger is driven by force from a hydraulic cylinder, wherein said hydraulic cylinder is supplied with hydraulic fluid by a pump, the improvement comprising:

a reservoir containing hydraulic fluid to be pumped by said pump, wherein said pump has a pump casing that is positioned within said reservoir to be at least partially submerged in hydraulic fluid within said reservoir, said pump is configured to draw hydraulic fluid from said reservoir and pump said hydraulic fluid out of said reservoir.

9. The improvement according to claim 8, comprising an electric motor and wherein said pump is driven by said electric motor, said electric motor located outside said reservoir and including an output shaft coupled to said pump.

10. The improvement according to claim 8, comprising an electric motor having an output shaft, said electric motor located outside said reservoir, said electric motor fastened to said pump by fasteners that penetrate through a wall of said reservoir, wherein a ring seal is compressed against said wall by said fasteners.

11. The improvement according to claim 10, wherein said pump comprises a drive shaft, and comprising a mechanical coupling, and a motor mount surrounding said coupling, said output shaft and said drive shaft coupled together by said mechanical coupling, wherein said pump is sealed to said reservoir by being fastened to said motor mount to compress said ring seal.

12. The improvement according to claim 8, comprising an electric motor and a mechanical coupling, and wherein said pump is driven by said electric motor via said mechanical coupling, said electric motor and said mechanical coupling located outside a sealed integrity of said reservoir.

* * * * *